(12) United States Patent
Nair

(10) Patent No.: US 10,186,290 B2
(45) Date of Patent: Jan. 22, 2019

(54) DATA STORAGE DEVICE SAVING PARTIAL MAP WHEN READ-MODIFY-WRITE FAILS DURING SHINGLED WRITING

(71) Applicant: Western Digital Technologies, Inc., San Jose, CA (US)

(72) Inventor: Ajay S. Nair, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 139 days.

(21) Appl. No.: 15/604,717

(22) Filed: May 25, 2017

(65) Prior Publication Data

US 2018/0341565 A1 Nov. 29, 2018

(51) Int. Cl.
*G06F 11/00* (2006.01)
*G11B 5/596* (2006.01)
*G11B 20/18* (2006.01)
*G11B 19/04* (2006.01)
*G06F 11/14* (2006.01)

(52) U.S. Cl.
CPC ...... *G11B 5/59627* (2013.01); *G06F 11/1402* (2013.01); *G11B 19/047* (2013.01); *G11B 20/18* (2013.01); *G06F 2201/82* (2013.01)

(58) Field of Classification Search
CPC ............ G06F 11/1402; G11B 5/59267; G11B 19/047; G11B 20/18; G11B 20/1889; G11B 27/105; G11B 27/19
See application file for complete search history.

(56) References Cited

U.S. PATENT DOCUMENTS

| | | | |
|---|---|---|---|
| 8,006,027 B1 | 8/2011 | Stevens et al. | |
| 8,661,193 B1* | 2/2014 | Cobos | G11B 20/10 |
| | | | 711/100 |
| 9,047,923 B1* | 6/2015 | Lum | G11B 5/012 |
| 9,281,009 B1 | 3/2016 | Burton et al. | |
| 9,536,563 B1* | 1/2017 | Liu | G11B 20/1879 |
| 9,842,622 B1* | 12/2017 | Monroe | G11B 20/1889 |
| 10,140,065 * | 11/2018 | Huff | G06F 3/0665 |
| 2010/0235678 A1* | 9/2010 | Kompella | G06F 11/1441 |
| | | | 714/5.1 |

* cited by examiner

*Primary Examiner* — Marc Duncan

(57) ABSTRACT

A data storage device is disclosed wherein a first host block is written to a first data sector, and when writing a second host block to a second data sector the first host block is read from the first data sector. When the read of the first host block fails, a partial map is generated identifying a location of the second host block in the second data sector, the partial map is stored in a non-volatile memory, and the second host block is written to the second data sector. When a power failure occurs after writing the second host block to the second data sector, an exception entry is updated using the partial map, wherein the exception entry is associated with the first and second host blocks.

14 Claims, 8 Drawing Sheets

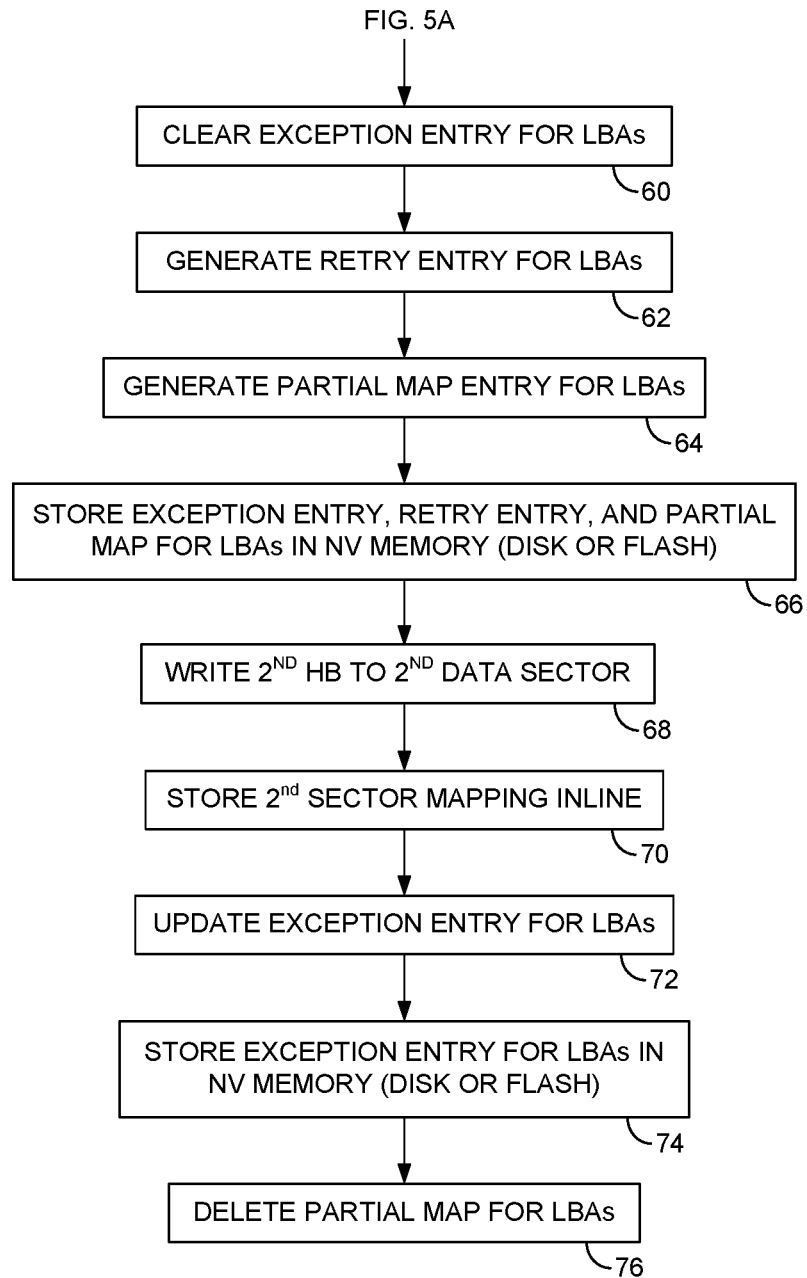

DATA STORAGE DEVICE SAVING PARTIAL MAP WHEN READ-MODIFY-WRITE FAILS DURING SHINGLED WRITING

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 5B is a flow diagram according to an embodiment wherein when the read part of a read-modify-write operation fails, a partial map is generated to identify a location of the second host block written to the second data sector.

DETAILED DESCRIPTION

Figure 2A:
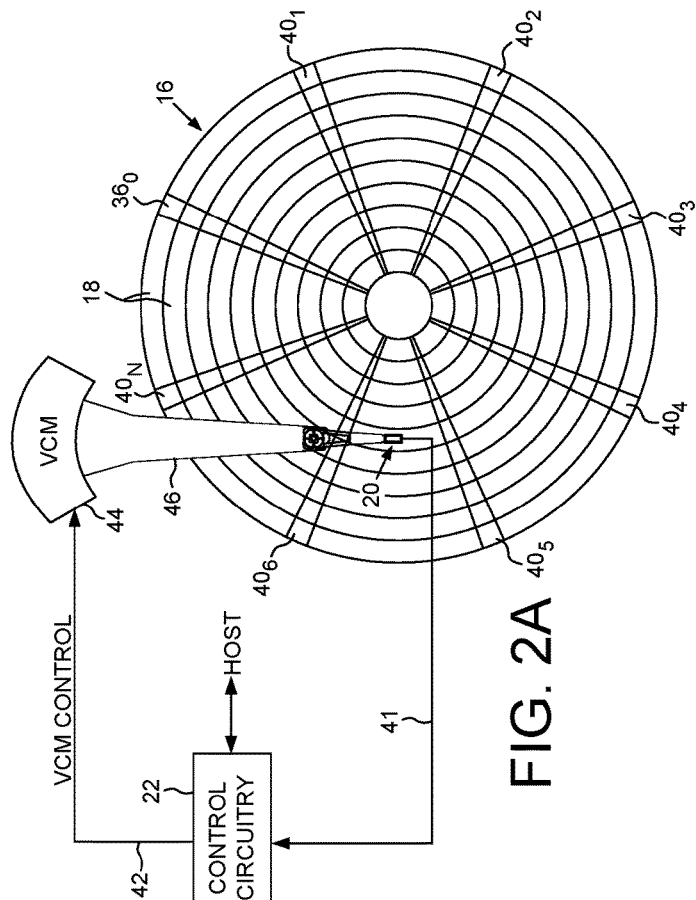
FIG. 2A shows a data storage device in the form of a disk drive comprising a head actuated over a disk.
Figure 2B:
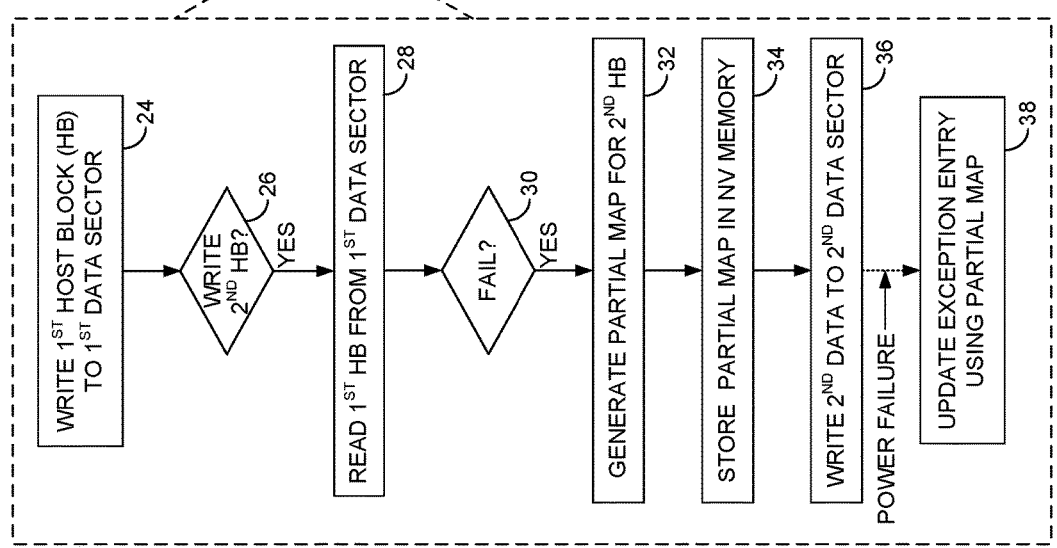
FIG. 2B is a flow diagram according to an embodiment wherein when the read part of a read-modify-write fails, a partial map is generated to identify a location of the new host blocks written to a new data sector and used to update an exception entry associated with a plurality of host blocks.

FIGS. 2A and 2B show a data storage device in the form of a disk drive according to an embodiment comprising a disk 16 having a plurality of tracks 18, wherein each track comprises a plurality of data sectors each configured to store at least two host blocks. The disk drive further comprises a head 20 actuated over the disk 16, and control circuitry 22 configured to execute the flow diagram of FIG. 2B. A first host block is written to a first data sector (block 24), and when a write command is received to write a second host block to a second data sector (block 26), the first host block is read from the first data sector (block 28). When the read of the first host block fails (block 30), a partial map is generated identifying a location of the second host block in the second data sector (block 32). The partial map is stored in a non-volatile memory (block 34), and after storing the partial map in the non-volatile memory, the second host block is written to the second data sector (block 36). When a power failure occurs after writing the second host block to the second data sector, an exception entry is updated using the partial map, wherein the exception entry is associated with the first and second host blocks (block 38).

Figure 2C:
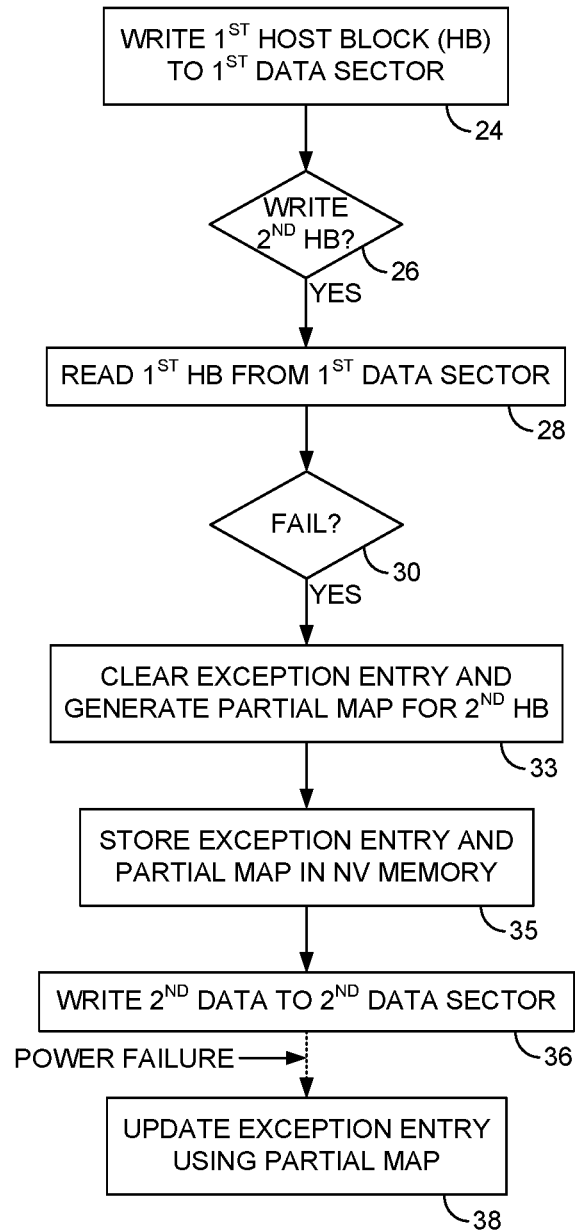
FIG. 2C is a flow diagram according to an embodiment wherein the exception entry is cleared when the read part of a read-modify-write fails to indicate all of the host blocks associated with the exception entry are invalid.

In an embodiment shown in the flow diagram of FIG. 2C, the exception entry may be cleared at block 33 and the cleared exception entry stored in the non-volatile memory at block 35. In this embodiment, clearing the exception entry identifies all of the host blocks associated with the exception entry as being invalid since the read of the first host block from the first data sector failed, and the write of the second host block to the second data sector has yet to complete. If the write of the second host block is completed successfully before the power failure, then after the power failure the partial map is used to update the exception entry to identify the second host block as being valid (the first host block remains invalid).

Figure 1:
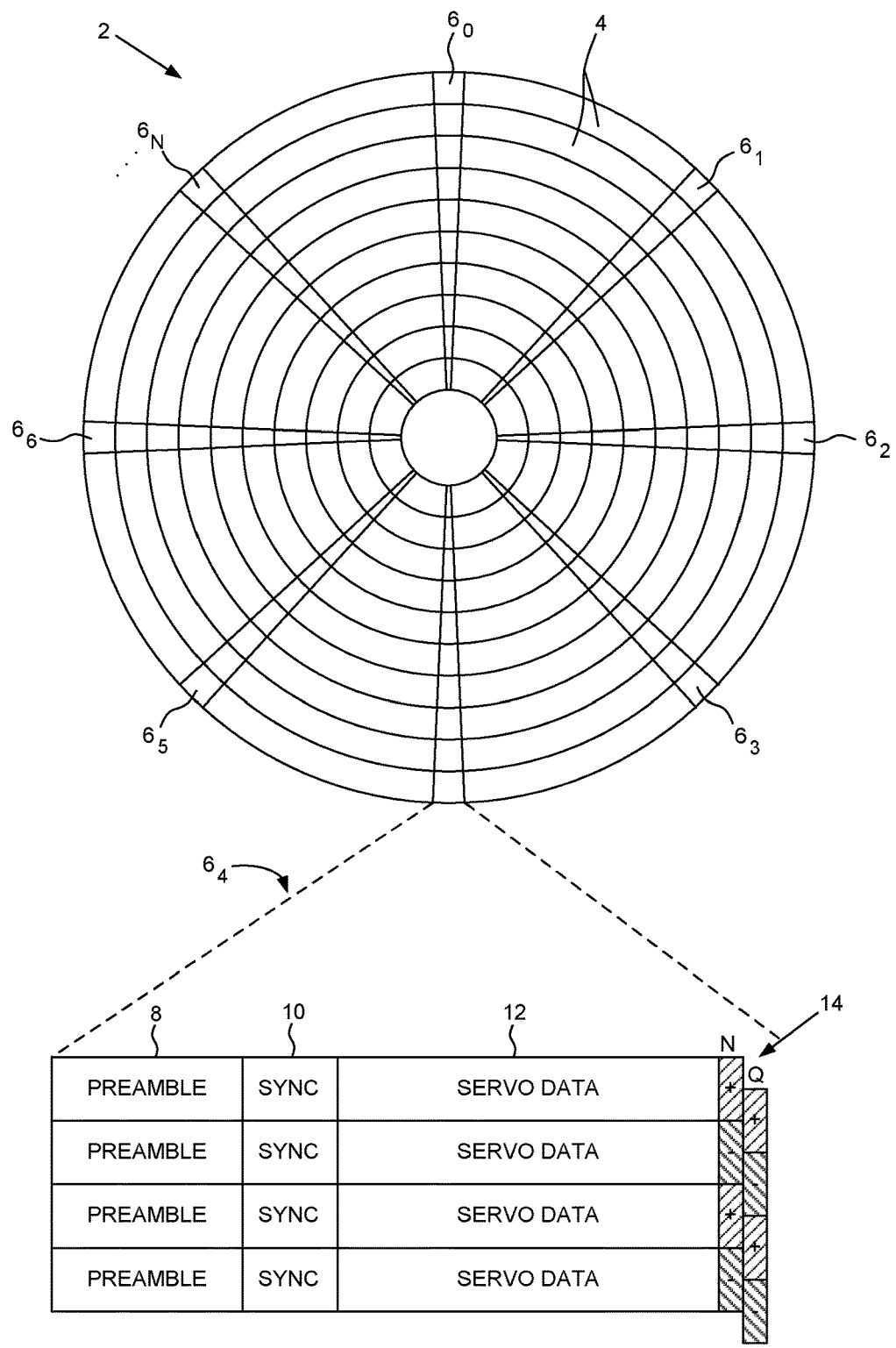
FIG. 1 shows a prior art disk format comprising a plurality of servo tracks defined by servo sectors.

In the embodiment of FIG. 2A, the disk 16 comprises a plurality of servo sectors $40_0$-$40_N$ that define a plurality of servo tracks, wherein data tracks are defined relative to the servo tracks at the same or different radial density. The control circuitry 22 processes a read signal 41 emanating from the head 20 to demodulate the servo sectors and generate a position error signal (PES) representing an error between the actual position of the head and a target position relative to a target track. A servo control system in the control circuitry 22 filters the PES using a suitable compensation filter to generate a control signal 42 applied to a voice coil motor (VCM) 44 which rotates an actuator arm 46 about a pivot in order to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, host blocks are written to the disk by mapping a logical block address (LBA) assigned to the host block to a physical block address (PBA) assigned to a data sector on the disk. This LBA to PBA indirect mapping enables the mapping out of defective data sectors from the disk, as well as dynamic LBA mapping (log structured writes) such as with shingled magnetic recording (SMR) where data is written to consecutive (overlapping) data tracks. With dynamic LBA mapping, the LBAs of host blocks are remapped to a new data sector (e.g., at the beginning of a circular buffer) whenever the LBAs are overwritten with new data.

Figure 3A:
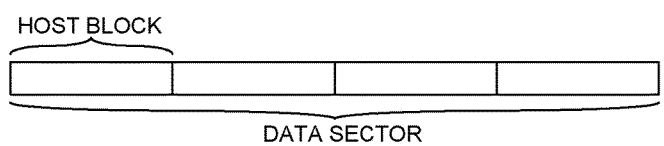
FIG. 3A shows an embodiment wherein each data sector stores more than one host block (four host blocks in the example).

FIG. 3A shows an embodiment wherein each data sector may be configured to store multiple host blocks, where in the example of FIG. 3A each data sector is configured to store four host blocks. In one embodiment a translation table may track the LBA to PBA mapping, where the resolution of the LBA to PBA mapping may correspond to the data sector size. An example translation table entry is shown in FIG. 3E which includes a starting LBA, a corresponding PBA, and a run-length of written host blocks (written LBAs). In one embodiment, the run-length is specified as a number of data sectors written meaning the translation table entry assumes a full data sector of host blocks is always written. However, in one embodiment less than a full data sector of host blocks (e.g., a single host block) may be written to a data sector. When this happens and a subsequent write operation attempts to write a second LBA consecutive with a first LBA previously stored in a partially written data sector, the control circuitry may perform a read-modify-write operation in order to read the first LBA, and then write the first and second LBAs to a new data sector. However if the read of the first LBA fails, only the second LBA will be written to the second data sector resulting in a runt write as shown in FIG. 3B.

Figure 3B:
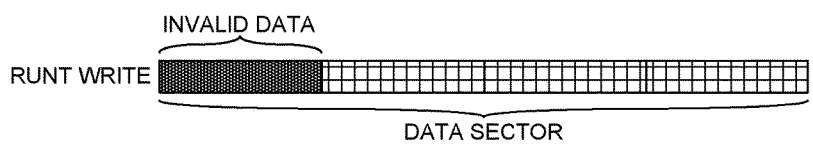
FIG. 3B shows an example of a runt write to a new data sector when the read part of a read-modify-write fails.
Figure 3C:
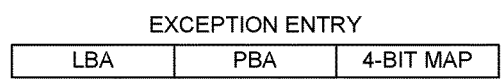
FIG. 3C shows an embodiment of an exception entry that tracks partially written data sectors due to the read part of a read-modify-write failing.

When a runt write such as shown in FIG. 3B occurs, in one embodiment the control circuitry generates an exception entry in order to track the valid host blocks within the partially written data sector. An example exception entry is shown in FIG. 3C as comprising an LBA and corresponding PBA, as well as a 4-bit map which identifies the locations within the data sector that stores valid host blocks. In the example of FIG. 3B, the 4-bit map for the exception entry may be 0111 to indicate that the data associated with the LBA assigned to the first host block of the data sector is invalid (due to the failed read-modify-write). In one embodiment, the control circuitry may generate a partial map that may be used to update an exception entry if a power failure occurs after a read-modify-write operation but before the exception entry is updated and flushed to non-volatile memory.

Figure 4A:
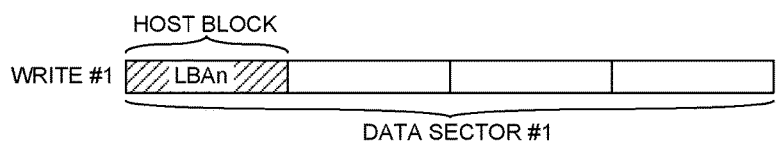
FIGS. 4A-4E illustrate an embodiment when the read part of a read-modify write fails, including to generate an exception entry that tracks the partially written data sector due to the runt write.
Figure 4B:
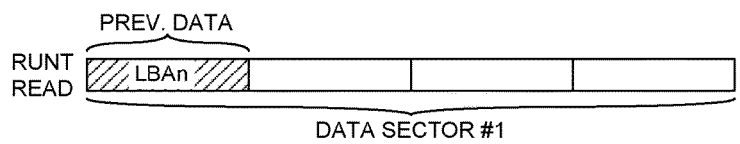
Figure 4C:
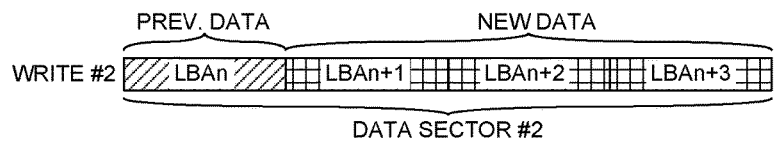
Figure 4D:
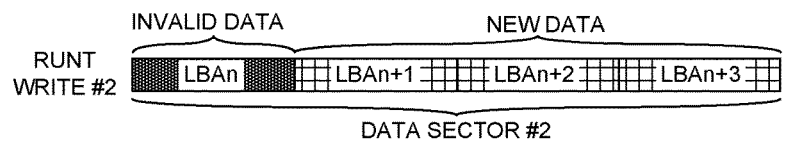
Figure 4E:
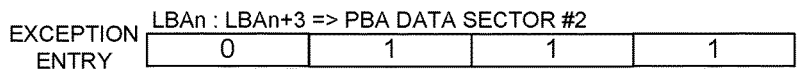

This embodiment is further understood with reference to FIGS. 4A-4E wherein during a first write operation, a first LBAn assigned to a first host block may be written to a first data sector. The location within the data sector to write the host block is determined in this embodiment as the remainder of the LBA number divided by the data sector size. For example, if the LBAn=504 and the data sector size is 4 host blocks, then the location within the first data sector is 504 MOD 4=0 or the first block of the data sector as shown in FIG. 4A. If during the first write operation LBAn=505, then the host block would be written to the second block of the data sector (505 MOD 4=1). If during a second read operation LBAs that are consecutive with the previously written LBAn are to be written, then a read-modify-write is executed by first reading the host block from LBAn mapped to the first data sector. The host block assigned to LBAn is then combined with the new host blocks assigned to the consecutive LBAs (e.g., LBAs 505, 506, 507), and the combined host blocks are written to a second data sector as shown in FIG. 4C. However, if the read part of the read-modify-write operation fails such that the host block assigned to LBAn cannot be read from the first data sector, then only the new host blocks are written to the second data sector as shown in FIG. 4D. The LBAn is still mapped to the second data sector, but the data associated with LBAn is considered invalid. In one embodiment, the invalid state of LBAn is represented by a 4-bit map (0111) of an exception entry as shown in FIG. 4E.

Figure 4F:
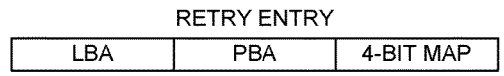
FIG. 4F shows an embodiment of a retry entry used to execute a retry operation on the data sector that failed the read part of the read-modify-write.

In one embodiment, when the read part of a read-modify-write fails, the control circuitry generates a retry entry such as shown in FIG. 4F so that a retry operation may be executed on the failed data sectors. If a host block is successfully recovered during a retry operation, the control circuitry may perform another read-modify-write in order to restore the validity of an LBA. Referring to the example of FIGS. 4B and 4D, if the host block is recovered from the first data sector during a retry operation, then the second data sector shown in FIG. 4D is read in order to read the host blocks for the valid LBAs (LBAn+1, LBAn+2, LBAn+3). All four host blocks are combined and written to a third data sector, the translation table is updated, and the exception entry is deleted.

Figure 5A:
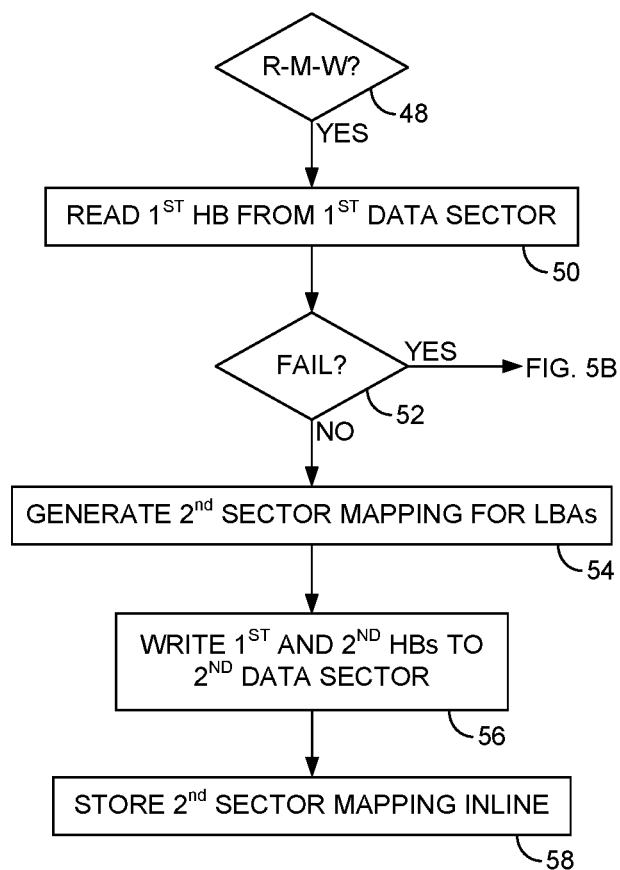
FIG. 5A is a flow diagram according to an embodiment wherein during a read-modify-write operation a first host block is read from a first partially written data sector, combined with a second host block, and the two host blocks written to a second data sector.

FIG. 5A is a flow diagram according to an embodiment wherein when a read-modify-write operation is executed to write a second host block (block 48), a first host block is first read from a first data sector (block 50). If the first host block is recovered successfully, then a sector mapping is generated to map the LBA of the first host block and the LBA of the second host block to a second data sector (block 54). The first and second host blocks are then written to the second data sector (block 56), and the sector mapping is written inline on the disk. In one embodiment, the inline sector mapping may identify a starting LBA and a run-length of the number of LBAs written at the resolution of the data sector size. For example, if only a first and second host block are written to the second data sector, the inline sector mapping may indicate the entire data sector was written.

Figure 3D:
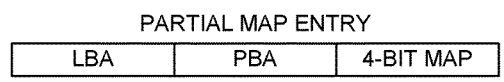
FIG. 3D shows an embodiment of a partial map that may be used to update an exception entry after a power failure.
Figure 3E:
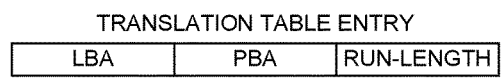
FIG. 3E shows an embodiment of an entry in a translation table used to map logical block addresses (LBAs) to physical block addresses (PBAs) assigned to the data sectors.

When the read of the first host block from the first data sector fails (block 52), the flow diagram of FIG. 5B is executed wherein an exception entry for the LBAs is cleared (block 60), such as by clearing a bit map in the exception entry (FIG. 3D). A retry entry is generated for the LBA of the failed data sector (block 62), and a partial map entry is generated that identifies the location of the second host block in the second data sector assuming the write of the second data sector is successful (block 64). For example, the partial map entry may identify the starting LBA of the second data sector, the PBA of the second data sector, and a 4-bit map having the value 0100 which identifies the data assigned to the first LBA as invalid, and the data assigned to the second LBA as valid. The cleared exception entry, the retry entry, and the partial map for the LBAs are then stored in a non-volatile memory (block 66), such as in a reserved area on the disk or in a Flash memory. The second host block is written to the second data sector (block 68) and the sector mapping for the second data sector is written inline on the disk (block 70). The exception entry is then updated to identify the invalid and valid host blocks in the second data sector (block 72), for example, using the partial map. The exception entry for the LBAs is then stored in a non-volatile memory (block 74), and the partial map is deleted (block 76).

Figure 6:
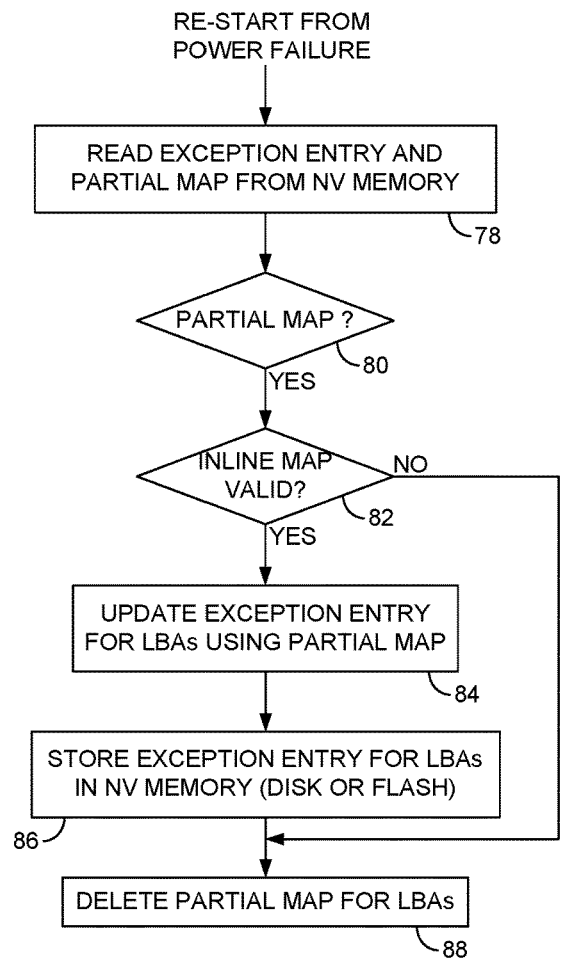
FIG. 6 is a flow diagram according to an embodiment wherein when a power failure occurs after writing the second host block to the second data sector, the partial map is used to update the exception entry that tracks the LBAs of the first and second host blocks.

The flow diagram of FIG. 6 shows an embodiment wherein the partial map stored in the non-volatile memory at block 66 of FIG. 5B may be used to update the exception entry in the event a power failure occurs after writing the sector mapping information inline at block 70, but before the exception entry for the LBAs can be updated at block 72 and flushed to the non-volatile memory at block 74. Accordingly, when the disk drives powers up the exception entry stored in the non-volatile memory will be in the cleared state indicating that none of the LBAs mapped to the second data sector store valid host blocks. The exception entry and partial map are read from the non-volatile memory (block 78). If there is a partial map pending (block 80), the last written inline sector mapping is read from the disk and compared to the partial map to determine whether the write to the second data sector was completed successfully (block 82). If so, the exception entry for the LBAs is updated using the partial map (block 84), for example, by updating its 4-bit map from 0000 to 0100 as reflected by the partial map. After updating the exception entry, the updated exception entry is flushed back to the non-volatile memory (block 86), and the partial map for the LBAs is deleted (block 88). If the inline sector mapping is invalid at block 82, meaning that the write operation to the second data sector failed due to the power failure, then the partial map for the LBAs is deleted at block 88 and the exception entry for the LBAs remains cleared indicating that all of the corresponding LBAs mapped to the second data sector are invalid due to the failed read and the failed write.

Figure 7:
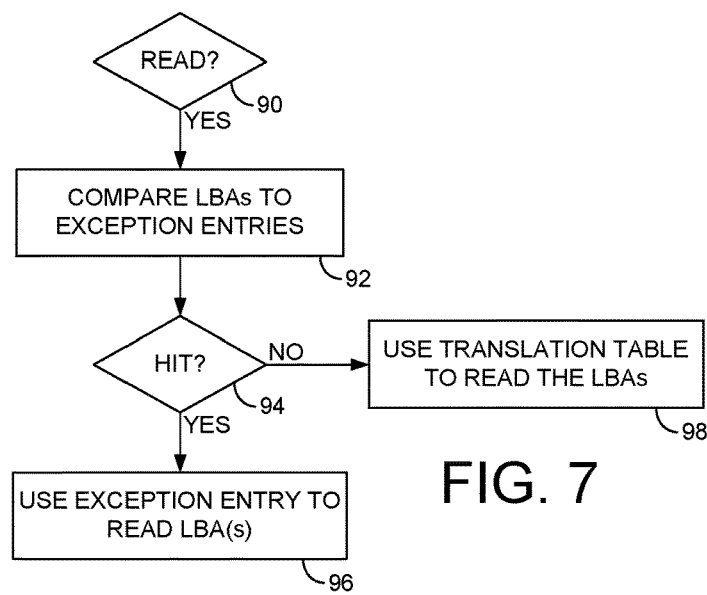
FIG. 7 is a flow diagram according to an embodiment, wherein during a read operation an exception entry may override a translation table in order to access the host blocks.

In one embodiment, the exception entries may be used to access valid host blocks during a read operation, or to return an error message to the host when attempting to read an LBA assigned to an invalid host block. FIG. 7 is a flow diagram showing an example of this embodiment wherein when a read operation is executed (block 90), the LBAs of the read operation are compared to the exception entries (block 92). If the LBAs correspond to an exception entry (block 94), then the exception entry is used to execute the read operation (block 96). If the LBAs do not correspond to an exception entry at block 94, then the standard translation table is used to execute the read operation (block 98). In one embodiment, the read operation executed at block 90 may be the read part of a read-modify-write operation. For example, if an LBA corresponding to the third host block of the second data sector in the above example were to be written, the exception entry for the LBAs would identify the second data sector as storing partially written host blocks (the second host block). Accordingly, the second data sector would be read at block 96 in order to retrieve the second host block which would then be combined with the third host block and written to a third data sector. The exception entry would then be updated to reflect the new state of the LBAs for the third data sector (e.g., a 4-bit map of 0110 to indicate the first LBA is assigned to an invalid host block, and the second and third LBAs are assigned to valid host blocks). In this embodiment, if the first host block corresponding to the first LBA is never recovered (e.g., after retry operations), then the corresponding exception entry for the LBAs would continuously identify the first LBA of the data sector as being assigned to an invalid host block.

In the example embodiments described above, each data sector is configured to store four host blocks. However, any suitable size may be selected for the data sectors, such as an embodiment wherein each host block is 512 bytes and each data sector is 4k bytes meaning that each data sector stores eight host blocks. In this embodiment, the bit map in the exception entries and the partial maps would be an 8-bit map to identify the validity of the eight host blocks stored in the corresponding data sector.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of tracks, wherein each track comprises a plurality of data sectors each configured to store at least two host blocks;
   a head actuated over the disk; and
   control circuitry configured to:
   write a first host block to a first data sector;
   process a write command to write a second host block to a second data sector by first reading the first host block from the first data sector; and
   when the read of the first host block fails:
   generate a partial map identifying a location of the second host block in the second data sector;
   store the partial map in a non-volatile memory;
   after storing the partial map in the non-volatile memory, write the second host block to the second data sector; and
   when a power failure occurs after writing the second host block to the second data sector, update an exception entry using the partial map, wherein the exception entry is associated with the first and second host blocks.

2. The data storage device as recited in claim 1, wherein when the read of the first host block fails the control circuitry is further configured to:
   clear the exception entry; and
   when storing the partial map in the non-volatile memory, further store the cleared exception entry in the non-volatile memory.

3. The data storage device as recited in claim 2, wherein the control circuitry is further configured to:
   generate a sector mapping that maps the first and second host blocks to the second data sector; and
   store the sector mapping inline on the disk after writing the second host block to the second data sector.

4. The data storage device as recited in claim 3, wherein after the power failure the control circuitry is further configured to:
   read the partial map and the cleared exception entry from the non-volatile memory;
   attempt to read the sector mapping from the disk; and
   when the sector mapping read from the disk is valid, update the exception entry using the partial map.

5. The data storage device as recited in claim 1, wherein the non-volatile memory comprises the disk.

6. The data storage device as recited in claim 1, wherein the control circuitry is further configured to use the updated exception entry to read valid host blocks stored in the second data sector.

7. The data storage device as recited in claim 1, wherein when the read of the first host block from the first data sector fails, after writing the second host block to the second data sector, the control circuitry is further configured to reread the first host block from the first data sector during a retry operation.

8. A method of operating a data storage device comprising a disk comprising a plurality of tracks, wherein each track comprises a plurality of data sectors each configured to store at least two host blocks, the method comprising:
   writing a first host block to a first data sector;
   processing a write command to write a second host block to a second data sector by first reading the first host block from the first data sector; and
   when the read of the first host block fails:
   generating a partial map identifying a location of the second host block in the second data sector;
   storing the the partial map in a non-volatile memory;
   after storing the partial map in the non-volatile memory, writing the second host block to the second data sector; and
   when a power failure occurs after writing the second host block to the second data sector, updating an exception entry using the partial map, wherein the exception entry is associated with the first and second host blocks.

9. The method as recited in claim 8, wherein when the read of the first host block fails further comprising:
   clearing the exception entry; and
   when storing the partial map in the non-volatile memory, further storing the cleared exception entry in the non-volatile memory.

10. The method as recited in claim 9, further comprising:
    generating a sector mapping that maps the first and second host blocks to the second data sector; and
    storing the sector mapping inline on the disk after writing the second host block to the second data sector.

11. The method as recited in claim 10, wherein after the power failure the method further comprises:
    reading the partial map and the cleared exception entry from the non-volatile memory;
    attempting to read the sector mapping from the disk; and
    when the sector mapping read from the disk is valid, updating the exception entry using the partial map.

12. The method as recited in claim 8, wherein the non-volatile memory comprises the disk.

13. The method as recited in claim 8, further comprising using the updated exception entry to read valid host blocks stored in the second data sector.

14. The method as recited in claim 8, wherein when the read of the first host block from the first data sector fails, after writing the second host block to the second data sector the method further comprises rereading the first host block from the first data sector during a retry operation.

* * * * *